US012395374B2

(12) United States Patent
Reul et al.

(10) Patent No.: US 12,395,374 B2
(45) Date of Patent: Aug. 19, 2025

(54) METHOD OF CONTROLLING A HOME APPLIANCE AND CONTROL SYSTEM

(71) Applicant: Electrolux Appliances Aktiebolag, Stockholm (SE)

(72) Inventors: Kurt Reul, Bad Windsheim (DE); Andreas Folkesson, Stockholm (SE); Lukas Kencl, Prague (CZ); Petr Tahal, Prague (CZ)

(73) Assignee: ELECTROLUX APPLIANCES AKTIEBOLAG, Stockholm (SE)

( * ) Notice: Subject to any disclaimer, the term of this patent is extended or adjusted under 35 U.S.C. 154(b) by 434 days.

(21) Appl. No.: 17/781,205

(22) PCT Filed: Dec. 4, 2019

(86) PCT No.: PCT/EP2019/083728
§ 371 (c)(1),
(2) Date: May 31, 2022

(87) PCT Pub. No.: WO2021/110263
PCT Pub. Date: Jun. 10, 2021

(65) Prior Publication Data
US 2022/0417051 A1 Dec. 29, 2022

(51) Int. Cl.
*H04L 12/28* (2006.01)
(52) U.S. Cl.
CPC ........ *H04L 12/282* (2013.01); *H04L 12/2818* (2013.01); *H04L 2012/285* (2013.01)
(58) Field of Classification Search
CPC ............... H04L 12/282; H04L 12/2818; H04L 2012/285
See application file for complete search history.

(56) References Cited

U.S. PATENT DOCUMENTS

| 10,637,681 B2* | 4/2020 | Brandt .................. H04W 8/00 |
| 2012/0109384 A1* | 5/2012 | Stepanian ............... H04W 4/60 700/275 |

(Continued)

FOREIGN PATENT DOCUMENTS

| WO | 2014063649 A1 | 5/2014 |
| WO | 2015200342 A1 | 12/2015 |

OTHER PUBLICATIONS

International Search Report and Written Opinion for PCT Application PCT/EP2019/083728, dated Jul. 24, 2020, 12 pages.

*Primary Examiner* — Qun Shen
(74) *Attorney, Agent, or Firm* — Moore & Van Allen PLLC

(57) ABSTRACT

A method of controlling a home appliance connected to the Internet via a gateway and an appliance control server of an appliance control cloud. The appliance executes control commands for operating the appliance received from the Internet via the gateway only if the commands are received from the appliance control cloud. A control command supply server of a control command supply cloud is connected to the home appliance control cloud via the Internet, and has at least one repository storing control instruction sets to operate the appliance. The method includes authenticating a request for remote control of the appliance received from the control command supply server via the Internet, and, responsive to positive authentication, forwarding control commands from the control command supply server to the appliance. The control commands are part of a set of instructions from the repository selected based on input received by a user terminal device.

19 Claims, 7 Drawing Sheets

(56) References Cited

U.S. PATENT DOCUMENTS

| | | | |
|---|---|---|---|
| 2012/0331156 A1* | 12/2012 | Colpitts | H04L 12/2818 709/227 |
| 2014/0218517 A1 | 8/2014 | Kim et al. | |
| 2014/0342709 A1* | 11/2014 | Stepanian | H04L 12/2834 455/414.1 |
| 2015/0058447 A1* | 2/2015 | Albisu | H04L 12/2818 709/219 |
| 2015/0319006 A1 | 11/2015 | Plummer et al. | |
| 2017/0242557 A1 | 8/2017 | Rotschield et al. | |
| 2017/0272945 A1* | 9/2017 | Link, II | H04W 12/041 |
| 2017/0332421 A1* | 11/2017 | Sternberg | H04L 12/4641 |
| 2018/0202093 A1* | 7/2018 | Park | D06F 34/24 |
| 2018/0205570 A1* | 7/2018 | Kang | H04L 12/2818 |
| 2019/0065901 A1* | 2/2019 | Amato | G06F 18/24133 |
| 2020/0112453 A1* | 4/2020 | Brown | G06F 16/24573 |
| 2022/0263902 A1* | 8/2022 | Binder | H04L 67/12 |

* cited by examiner

METHOD OF CONTROLLING A HOME APPLIANCE AND CONTROL SYSTEM

This application is a U.S. National Phase application of PCT International Application No. PCT/EP2019/083728, filed Dec. 4, 2019, which is incorporated by reference herein.

FIELD OF THE INVENTION

The present invention relates to a method of controlling a home appliance and to a control system for controlling the operation of a home appliance. The invention further relates to a computer program for controlling a home appliance.

BACKGROUND

Conventional home appliances, such as ovens, are generally controlled by using a user interface that includes buttons, a touchscreen and the like. More recent home appliances may be capable of connecting to a local wireless network. A mobile device that is connected to the same wireless network and that includes an application for connecting to the home appliance may be allowed to control the home appliance by sending control signals over the wireless network. Although such systems provide some benefits, their functionality is quite limited. On the other hand, such remote control bears the risk of misuse, in particular when the attempt is made by an unauthorized device to access the home appliance.

It is desirable to facilitate the control of such home appliance, and in particular to make it easier and more convenient for a user to control the home appliance. It is in particular desirable to enable a convenient and efficient control of the home appliance for a plurality of different operating scenarios, without requiring the user to manually control each operating step of the home appliance. It is also desirable to achieve a secure operation of the home appliance, so that misuse of the home appliance can be prevented.

SUMMARY

There is a need to mitigate at least some of the drawbacks mentioned above and to improve the control of such home appliance. In particular, there is a need to provide an efficient and safe way of controlling the operation of the home appliance.

This need is met by the features of the independent claims. The dependent claims describe embodiments of the invention.

According to a first embodiment of the invention, a method of controlling a home appliance is provided. The home appliance is connected to the Internet via a gateway, wherein at least one home appliance control server of a home appliance control cloud is configured to communicate with the home appliance via the Internet and the gateway. The home appliance is configured to execute control commands for operating the home appliance which are received by the home appliance from the Internet via the gateway only if the control commands are received from the home appliance control cloud (in particular from one or more predetermined servers of the home appliance control cloud). At least one control command supply server of a control command supply cloud is provided and is connected to the home appliance control cloud via the Internet. The control command supply cloud comprises at least one repository storing sets of control instructions configured to operate the home appliance. The repository is provided on or is accessible by the at least one control command supply server.

The home appliance control cloud is distinct from the control command supply cloud. In particular, the servers of the home appliance control cloud are physically distinct and separate from the servers of the control command supply cloud. A user account is provided on the home appliance control server, and the user account is associated with the home appliance. The method comprises authenticating, by an authentication function of the home appliance control server, a request for remote control of the home appliance that is received from the control command supply server via the Internet, wherein the request is related to the user account. The method further comprises, responsive to a positive authentication, the forwarding of one or more control commands received from the control command supply server to the home appliance, wherein the one or more control commands are part of a set of control instructions from the repository that is selected based on input received by a user terminal device. The one or more control commands forwarded to the home appliance are such that the home appliance executes the one or more control commands upon reception.

By such method, an efficient and secure control of the home appliance may be realized. A user of the home appliance does no longer need to enter individual commands for controlling the home appliance, but the user can select an instruction set from the repository and can command the execution of the control commands of such instruction set with a single input. Furthermore, the flexibility is significantly improved, since the instruction sets are provided on a separate server on the Internet, so that instruction sets may be provided by a plurality of different sources. The method thus allows the tailoring of an instruction set to the needs of the respective task to be performed by the home appliance, which leads to an improved result of the operation of the home appliance and further contributes to facilitating control. At the same time, control of the home appliance is limited to the home appliance control cloud, so that the safety and security of control can be ensured. In particular, since servers outside the home appliance control cloud are incapable of controlling the home appliance, misuse of the remote control function of the home appliance can be prevented. Although the home appliance is controlled from the publicly accessible Internet, and although the control commands are received by a separate server not forming part of the home appliance control cloud, operational safety is ensured.

The home appliance may for example be pre-configured with one or more predetermined server addresses of one or more servers of the home appliance control cloud. The home appliance may then further be configured to accept control commands only from one or more of these predefined servers. The server addresses may for example be defined during manufacturing of the home appliance and may be stored in the home appliance in such a way that they cannot be changed by a user of the home appliance. Other ways of ensuring that the home appliance is controlled from the Internet only by one of the servers of the home appliance control cloud are conceivable, such as providing an authentication between the home appliance and a respective home appliance control server prior to accepting control commands.

The authentication of the request for remote control may for example include the receiving of authentication credentials for the user account from the supply server or from the user terminal device.

The home appliance may be on a local network that is connected to the Internet via the gateway. The home appliance control cloud and the control command supply cloud are on the other side of the gateway on the Internet. In particular, none of the servers of the home appliance control cloud and none of the servers of the control command supply cloud is in the same local network as the home appliance. In particular, the only connection from the home appliance control cloud and the control command supply cloud to the home appliance is via the public Internet.

The gateway may for example be implemented in the home appliance, or the home appliance may be connected to the gateway via a local connection or a local network, for example via a local area network (LAN), via a wireless local area network (WLAN), via a personal area network (PAN) or wireless personal area network, or via a local peer-to-peer connection. The gateway may for example include a wireless access point, or the local network may include a wireless access point connected to the gateway via a LAN connection, in particular an Ethernet connection. The gateway can for example be implemented as a WLAN router. Personal area networks via which the home appliance can be connected include for example Bluetooth, ZigBee and Z-Wave. The gateway may thus for example also be a Z-Wave gateway. As indicated above, none of the servers of the home appliance control cloud or of the control command supply cloud is in the same WLAN, LAN or PAN as the home appliance.

In an embodiment, the control command supply server and/or the control command supply cloud is not directly associated with any home appliance to be controlled in accordance with the sets of control instructions. Accordingly, the sets of control instructions can be provided independently from any specific home appliance. The control command supply server does accordingly furthermore not need to be concerned with any safety measures to prevent misuse of controlled home appliances. Preferably, the control command supply server and/or the control command supply cloud is not capable of directly controlling such home appliance by sending control commands to the home appliance via the Internet without any intervening server outside the control command supply cloud which provides authentication of the commands.

The user terminal device may operate an application configured to establish a data connection to the control command supply server, wherein the control command supply server provides an interface allowing the application to access and search the repository for sets of control instructions for selecting said set of control instructions. A fast and efficient way of selecting the control instructions and of controlling the home appliance is thus provided.

The home appliance control server is preferably located remote from the home appliance and from the gateway, wherein the control command supply server is located remote from the home appliance, from the gateway and from the home appliance control server. The home appliance control server and the control command supply server a physically separate servers located at different locations, for example at different computing centers. Preferably, at least one home appliance control server is provided for each of different jurisdictions or different countries. This allows a safe and secure control of the respective associated home appliances in accordance with the applicable standards and data regulations.

The home appliances may form part of a group of home appliances, wherein the home appliance control cloud may be configured to control home appliances only of said group of home appliances. The home appliances in said group all provide a corresponding or the same interface towards the home appliance control cloud, said interface being only accessible via said home appliance control cloud. A safe control having reduced complexity may thus be achieved. The home appliances in the group may for example be manufactured by the same manufacturer. By providing the same or corresponding interfaces, the control is safer and less prone to malfunctions, since compatibility between the interfaces can be ensured.

In an embodiment, the method further comprises providing a second user account for a user of the user terminal device on the control command supply server; responsive to a request to link the second user account to said user account on the home appliance control server, authenticating, by the home appliance control server, the user of said user account on the home appliance control server; and, responsive to a positive authentication, linking the user account on the control command supply server to the user account on the home appliance control server. By such method, the efficiency of the control may further be improved, in particular since no separate authentication of the user at the home appliance control server may be required as the user may be authenticated via the linked accounts, so that a faster control becomes possible. The user may for example be only required to authenticate himself at the control command supply server. For linking the accounts, the user may be authenticated by means of the user terminal device providing direct authentication at the home appliance control server, or authentication may occur by means of the user terminal device via the control command supply server.

The authentication of a request for remote control may comprise providing authentication information associated with the user of the user account from the user terminal device or from the control command supply server to the home appliance control server. Alternatively, it may comprise supplying authentication information provided by a second user account on the control command supply server linked to said user account on the home appliance control server from the control command supply server to the home appliance control server. While the former may provide an improved operational safety, the latter provides a faster and more efficient control.

The home appliance control server may comprise an application programming interface (API). The control command supply server may provide the one or more control commands to the application programming interface of the home appliance control server via the Internet. The control commands may in particular be in conformity with the control commands made available by the application programming interface.

The transmission of data, in particular of the control commands, between the control command supply server and the home appliance control server may be based on the https protocol. A secure and efficient data transmission may thus be achieved. The application programming interface may in particular be a REST (representational state transfer) API or a RESTful API. Interoperability of the home appliance control server with other and different kinds of control command supply clouds may thus be ensured.

The control command supply server may encode the one or more control commands in a JavaScript object notation (JSON) format and may transmit the one or more encoded control commands to the home appliance control server. Using such language independent data format has the advantage of further improving the interoperability between different clouds. By using JSON over https for the data transmission, a fast and reliable transmission of the control commands can be achieved while ensuring interoperability with different supplier clouds.

The home appliance control server may implement a gateway function that provides a conversion between a protocol used by the control command supply server to transmit the control commands and a protocol used by the home appliance control server to communicate received control commands to the home appliance. The gateway function may for example translate control commands received in the JSON format into a format understood by the home appliance, such as a proprietary format used by the manufacturer of the home appliance. The control of the home appliance is thus made more flexible and more compatible, in particular since the control command supply cloud can provide the control commands in a generic format and does not need to be concerned with the format of control commands understood by the home appliance to be controlled. For controlling home appliances for different manufacturers, the control command supply cloud does accordingly not have to store plural corresponding instructions sets for different home appliance types, but is enabled to use one common generic instruction set. This does not only result in savings of storage space, but also in a faster processing of control command requests and in an enhanced flexibility.

The home appliance control server may use a message queuing telemetry transport (MQTT) protocol for communication with the home appliance. The home appliance control server may accordingly encode the commands into a format understood by the home appliance and may then transmit these commands using the MQTT protocol. The home appliance control server may in particular operate as a message broker, and the appliance may operate as a client. An efficient data transmission may thus be achieved, since the MQTT protocol only requires a small overhead. A safe and efficient control of the home appliance can thus be realized.

In an embodiment, the method further comprises receiving, by the home appliance control server, a message from the home appliance comprising information and/or events related to the operation of the home appliance; decoding, by the home appliance control server the received message; and forwarding, by the home appliance control server, the information and/or events comprised in the message to the control command supply server. Preferably, the control command supply server forwards the received information and/or events to the user terminal device. Additionally or alternatively, the control command supply server may use the received information and/or events to derive one or more control commands and provide the derived control command via the home appliance control server to the home appliance. By such method, the user of the home appliance can be informed about the current state of the home appliance. For example, if the home appliance is a cooking device, a current temperature and/or an elapsed time of operation of the cooking device may be provided for display to the user terminal device. It further allows an automatic adjustment of the operating parameters.

For example, if the control command supply server determines that the current operating temperature is higher than the desired operating temperature, or that a certain operating time has already been achieved, it may adjust the operating parameters of the home appliance by deriving and sending a control command. For example, an operating program may be changed, a temperature may be decreased, or an operating time may be reduced. Feedback control may thus be enabled.

Additionally or alternatively, the home appliance control server may derive from the received information and/or events a control command and may transmit the derived control command to the home appliance. A safety feature may for example be implemented, according to which when the home appliance control server determines that the home appliance is operating outside predefined parameters, for example parameter bands or parameter sets, the home appliance control server may change operating parameters of the home appliance or may shut down the home appliance. As an example, if the temperature of the home appliance indicates overheating, the home appliance control server may reduce the temperature or may shut down the home appliance.

The home appliance control server may for example monitor the home appliance, it may in particular request information and/or events from the home appliance, such as current operating parameters. The home appliance control server may then receive said message including the respective information and/or events.

The home appliance control server may for example monitor appliance state changes, such as a temperature change, a program change, a timing change and the like. Such state changes may for example also result from a user manipulating control elements on the home appliance.

When forwarding the information and/or events to the control command supply server, the home appliance control server may for example employ webhooks, in particular a http put request, in order to notify the control command supply cloud about the information and/or the event.

In an embodiment, the method further comprises receiving, by the home appliance control server and from the control command supply server, a control command to capture an image indicative of the operation of the home appliance; transmitting, by the home appliance control server, a request to the home appliance to capture an image; receiving, by the home appliance control server and in response to the request, a captured image from the home appliance, transmitting the received captured image to a storage server that is connected to the Internet; and making accessible the stored captured image to the user terminal device. By means of such method, it becomes possible for the user of the user terminal device to remotely monitor the home appliance. In particular, the home appliance can be monitored even if the user is far away from the home appliance as long as the user terminal device is connected to the Internet. The storage server may form part of the home appliance control cloud, yet preferably is distinct from the home appliance control cloud. The storage server may in particular be physically distinct and separate from the home appliance control server and from the control command supply server. The storage server may for example implement a cloud object store. A publicly accessible storage cloud may for example be used as the storage server. By such configuration, the complexity of the home appliance control server and of the control command supply server can be kept low, as these servers are relieved of the burden of providing the object store.

Alternatively, the home appliance control server may transmit the captured image to the control command supply server, and the control command supply server may transmit the image to the user terminal device or may make available the received image for download.

The method may further comprise sending a request for such image from the user terminal device to the control command supply server. Furthermore, the method may comprise retrieving, by an application running on the user terminal, an image captured by the home appliance and stored on the storage server.

The home appliance may for example be a cooking appliance, and the image may be taken from a space in which food is cooked or prepared, for example from an oven cavity. The home appliance may accordingly be provided with a respective camera. It may have an oven cavity at which the camera is aimed.

Preferably, the sets of instructions provided by the repository comprised generic control commands for controlling different models of the same type of home appliance. Interoperability can thus be ensured, and the instruction sets can be used for the same type of appliance, such as a cooker, for different makes and models.

The control commands transmitted by the control command supply server in accordance with a selected set of control instructions may comprise one or a combination, preferably all of the following control commands: A control command to set an operating program of the home appliance; a control command to set one or more parameters of the selected operating program; and a control command to start operation of the home appliance in accordance with the selected operating program and the set operating parameters.

For example, the home appliance is a cooking appliance, such as an oven. The operating program may be a heating program of the cooking appliance, such as 'heat from the bottom', 'heat from the top', 'grill', or the like. Operating parameters may preferably include a temperature and a time for the operating program to run (duration). The complex control program may thus be executed by the home appliance by only a single selection made by the user on the user terminal device. Control is thus facilitated and made fast and efficient.

In an embodiment, the home appliance is a cooking appliance, and the sets of control instructions are associated with recipes. Each set of control instructions comprises a sequence of control commands for operating the cooking appliance. The sequence of control commands may correspond to a sequence of cooking steps to be performed by the cooking appliance in accordance with the associated recipe. Preparation of food by the cooking appliance is thus facilitated and made fast and efficient.

In an embodiment, authenticating the request for remote control includes sending of a request from the home appliance control server to the user terminal device to confirm the enabling of remote control of the home appliance, and enabling remote control of the home appliance by the home appliance control server only if a user input is received that confirms the enabling of the remote control. Such request may be provided additionally or alternatively to the above described authentication methods. Accordingly, by letting the user directly confirm that remote control of the home appliance is enabled, the operational safety of the remote control may be further improved. For example, upon user confirmation, the user terminal device may send a confirmation message to the home appliance control server, in response to which the home appliance control server enables the remote control.

The method may include the step of receiving, by the control command supply server, a selection of one of the sets of control instructions from a user terminal device for controlling the home appliance, and the forwarding of the control commands to the home appliance control server in accordance with the selection, i.e. the control command supply server may forward one or more control commands that form part of the selected set of control instructions.

The method may furthermore comprise executing, by the home appliance, the one or more received control commands.

The home appliance is preferably a cooking appliance, yet it may also be a different appliance, such as a washer, a dryer, a washer-dryer, a dishwasher, a fridge, a freezer or the like. The cooking appliance may for example be an oven, a microwave, a steamer, a stove, a barbecue or the like.

The user terminal device is preferably a handheld mobile device, in particular a smartphone, a tablet, a phablet, a personal digital assistant (PDA) or a laptop.

According to a further embodiment of the invention, a control system for controlling the operation of a home appliance is provided. The home appliance is connected to the Internet via a gateway, and the control system comprises a home appliance control server of a home appliance control cloud connected to the Internet, wherein the home appliance control server is configured to communicate with the home appliance via the Internet and the gateway. It further comprises the home appliance, wherein the home appliance is configured to execute control commands for operating the home appliance which are received by the home appliance from the Internet via the gateway only if the control commands are received from the home appliance control cloud. The control system further includes a control command supply server of a control command supply cloud, wherein the control command supply server is connected to the home appliance control cloud via the Internet. The control command supply cloud comprises at least one repository storing sets of control instructions configured to operate the home appliance, wherein the repository is provided on or is accessible by the control command supply server. The home appliance control cloud is distinct from the control command supply cloud. The control command supply cloud provides an interface for access by a user terminal device, preferably by an application running on the user terminal device.

The interface is configured to enable selection of one of the sets of control instructions via the user terminal device. The home appliance control server is configured to establish an association between the home appliance and a user account provided on the home appliance control server, wherein the home appliance control server further implements an authentication function configured to authenticate a request for remote control of the home appliance received from the control command supply server via the Internet, the request being related to the user account. The home appliance control server is further configured to forward, responsive to a positive authentication, one or more control commands received from the control command supply server in accordance with the selected set of control instructions to the home appliance for the execution by the home appliance. With such control system, advantages similar to the ones outlined further above may be achieved.

The control system may furthermore comprise any of the above described components, such as the user terminal device, the storage server, the gateway, and the like. Furthermore, the components of the control system may have any of the above described configurations. In particular, the control system and its components may be configured to perform any of the methods described herein, and may in particular perform any of the described method steps.

According to a further embodiment of the invention, a computer program for controlling a home appliance is provided. The computer program comprises control instructions which, when executed by a data processor of a home appliance control server connected to the home appliance via the Internet and a gateway, and further connected to a control command supply server, cause the data processor to perform any of the above described methods. The computer program may be provided in a volatile or non-volatile memory, and may in particular be provided on a data carrier that stores the respective control instructions. The control instructions may in particular perform any of the above described methods if they are executed by one or more data processes of the above described control system.

It is to be understood that the features mentioned above and those yet to be explained below can be used not only in the respective combinations indicated, but also in other combinations or in isolation, without leaving the scope of the present invention. In particular, embodiments of the method may comprise any of the steps described herein with respect to the control system, and embodiments of the control system may be configured to perform any of the described method steps.

BRIEF DESCRIPTION OF THE DRAWINGS

The forgoing and other features and advantages of the invention will become further apparent from the following detailed description read in conjunction with the accompanying drawings.

In the drawings, like reference numerals refer to like elements.

DETAILED DESCRIPTION

Figure 1:
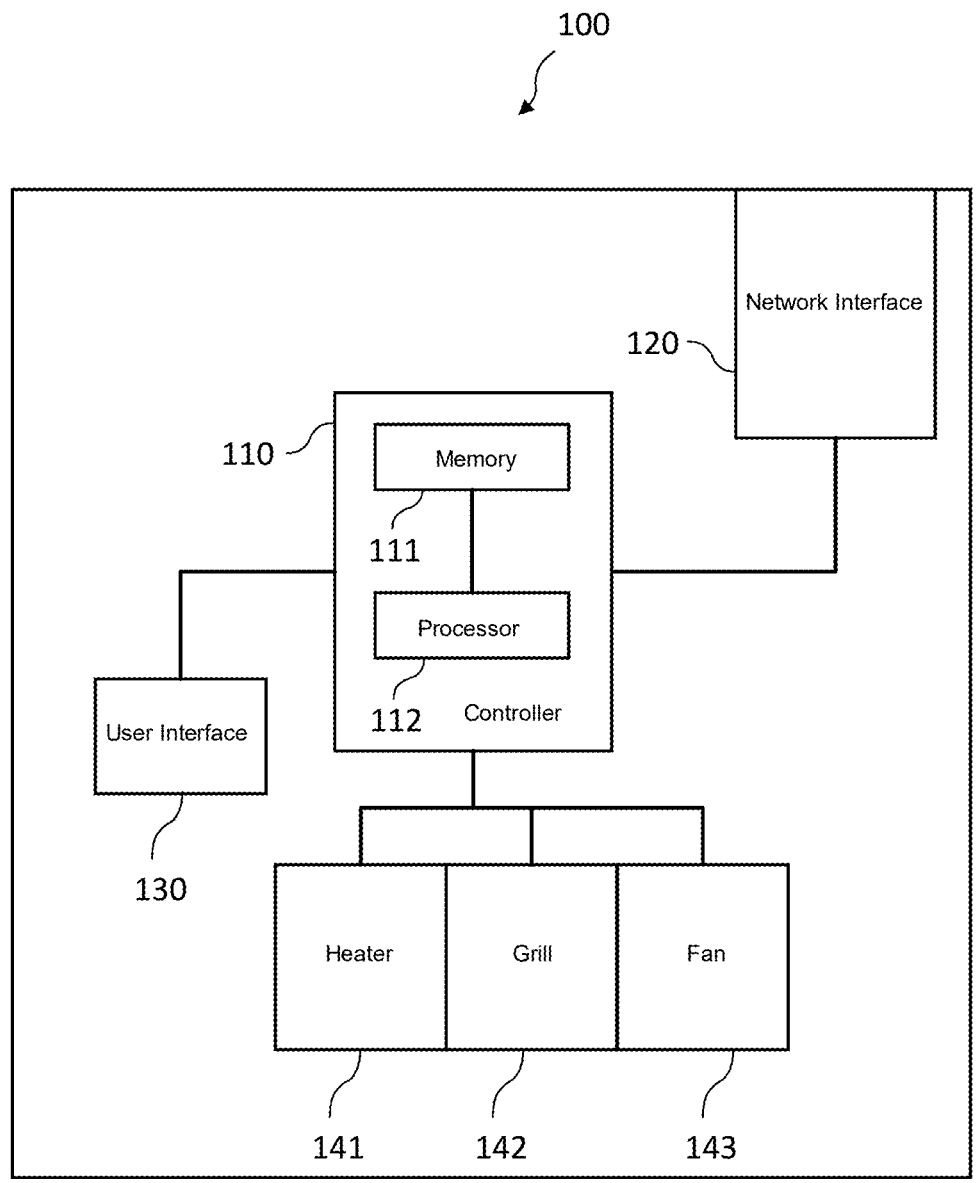
FIG. 1 is a schematic drawing showing a home appliance according to an embodiment of the invention.

In the following, embodiments of the invention will be described in detail with reference to the accompanying drawings. It is to be understood that the following description of the embodiments is given only for the purpose of illustration and is not to be taken in a limiting sense. It should be noted that the drawings are to be regarded as being schematic representations only, and elements in the drawings are not necessarily to scale with each other. Rather, the representation of the various elements is chosen such that their function and general purpose become apparent to a person skilled in the art. As used herein, the singular forms "a," "an," and "the" are intended to include the plural forms as well, unless the context clearly indicates otherwise. The terms "comprising," "having," "including," and "containing" are to be construed as open-ended terms (i.e., meaning "including, but not limited to,") unless otherwise noted.

Embodiments of the present invention provide a solution that allows a plurality of control instruction sets to be made available to a user of a home appliance via the Internet. Such control instruction sets can be stored in the cloud of a supplier, which may for example provide cooking recipes or the like. Conventional solutions do not allow the downloading of recipes and respective control instructions from the Internet, and only a very limited and predefined control instruction set may be available. Also, such control instructions are generally transmitted over a WiFi connection, so that functionality and in particular mobility of the data and the user is limited. On the other hand, the present solution restricts access by external data sources, such as a supplier cloud, to the home appliance and to the infrastructure controlling the home appliance, such as cloud and associated server.

FIG. 1 schematically shows a home appliance 100 according to an embodiment. The home appliance 100 includes a controller 110 that comprises processor 112 and a memory 111. The controller is coupled or connected to a network interface 120, which may for example be a wireless network interface for providing a WLAN connection, or a LAN interface, in particular an Ethernet interface for connecting to a local area network. Controller 110 can communicate via the network interface 120, for example by receiving control commands for execution by the processor 112 or transmitting information, such as information on the current operating state and operating parameters of home appliance 100.

Processor 112 may for example be a microprocessor, but may also be an application specific integrated circuit (ASIC), a digital signal processor (DSP), or other type of processors suitable for controlling the home appliance 100. Memory 111 may comprise volatile and/or non-volatile memory, such as RAM, ROM, flash-memory, a hard drive and the like.

Controller 110 is coupled to or connected to a user interface 130. User interface 130 may comprise hard or soft control elements, such as buttons, switches, rotary dials or the like which may be provided on a control panel of the home appliance 100. User interface 130 may further comprise a display, such as an LCD, an LED, or another type of display for displaying information on operating parameters and the operating state of the home appliance 100 to the user. Other displays, such as simple alphanumerical displays, segmented displays, or simple light-emitting diodes may be used to indicate certain operating states may additionally or alternatively be comprised in the user interface 130. User interface 130 may also comprise a touchscreen that allows both, the displaying of information to the user the home appliance 100, and the entering of information and control commands, for example by means of soft buttons and the like.

In the example of FIG. 1, the home appliance 100 is a cooking appliance, and it includes components such as the heater 141 (e.g. for heating a cooking cavity), a grill 142 and a fan 143. It should be clear that the components illustrated in FIG. 1 are only exemplary, and the home appliance 100 may comprise further or different components that can be controlled via the controller 110. Controller 110 controls the components 141, 142, 143, for example by respective control relays that provide electrical power to the respective component, such as to a heating coil of heater 141, by turning on or adjusting the fan speed of fan 143 or the like. Controller 110 may for example be configured to control the components of home appliance 100 in accordance with an operating program, such as a program providing heat from the top and bottom of the cooking cavity, or providing heat only or in addition by the grill 142, or by using a cooking program with circulating air by operating fan 143. Controller 110 controls the components of home appliance 100 in accordance with operating parameters, such as a desired temperature for the cooking cavity, or a desired duration of the cooking program after the expiry of which the controller turns off the respective components, such as the heater 141.

It should be clear that in other implementations, the home appliance 100 comprises other components which are controlled by controller 110, for example a motor rotating a drum of a washing machine, a heater for heating the water used in the washing machine, and the like. Furthermore, it should be clear that home appliance 100 can include several sensors for measuring operating parameters of the home appliance 100 and for providing feedback, such as a temperature sensor for the oven cavity, a water level sensor for measuring the water level in the tub of a washing machine, a weight sensor, a moisture sensor, and the like.

The components of the home appliance 100 and the sensors (not shown) may be coupled to the controller 110 via respective input/output interfaces (not shown). These may include digital-to-analog converters, respective amplifiers, control relays and the like for providing the desired voltage and current to the components of the home appliance 100.

Memory 111 stores control instructions which when executed by the processor 112 control the functions and operation of the home appliance 100. This can occur based on user input via user interface 130, in accordance with predefined operating programs and parameters stored in memory 111, and/or in accordance with control commands received via the network interface 120.

Memory 111 stores predefined addresses of servers on the Internet. Controller 110 is configured such that if control commands are received from such predefined server, the control commands are executed by the controller 110. Such servers are in particular predetermined home appliance control servers. If control commands are received from the Internet that are not originated by such home appliance control server, the controller 110 is configured to not accept such control commands and to not execute the respective operations.

Figure 2:
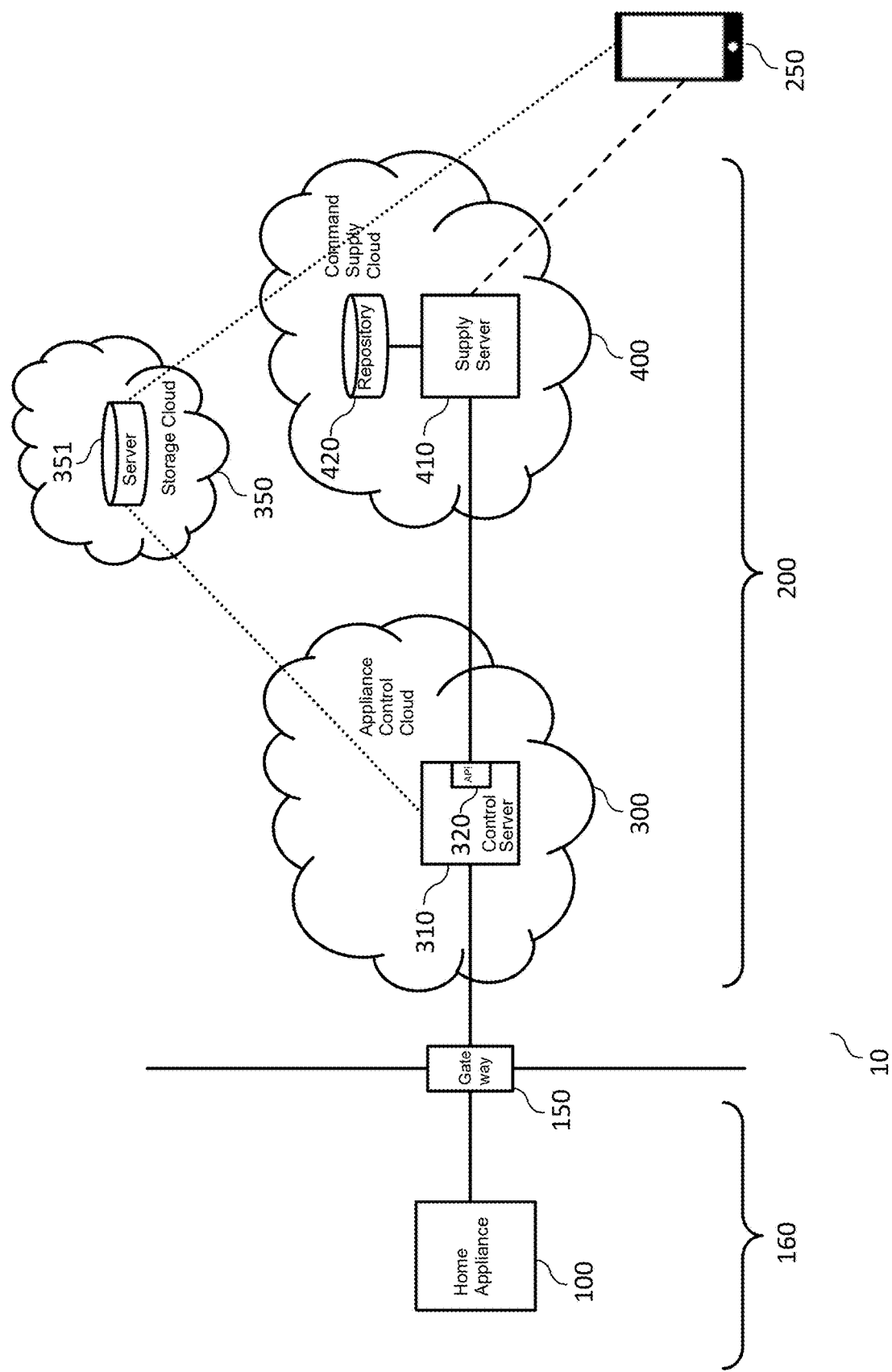
FIG. 2 is a schematic drawing showing a control system according to an embodiment of the invention.

FIG. 2 schematically shows a control system 10 according to an embodiment. The home appliance 100 is connected via a gateway 150 to the Internet 200. Home appliance 100 may for example be on a local network 160, such as a local area network or a wireless local area network. The control system 10 includes a home appliance control server 310 (short: control server 310) which forms part of a home appliance control cloud 300. The home appliance control cloud 300 is provided on the Internet 200. The servers of the home appliance control cloud 300 are in particular not located in the local network 160, but they can communicate with the home appliance 100 only via the Internet 200 and the gateway 150. In such configuration, the home appliance control cloud 300 can provide a safe and secure way of controlling the home appliance 100 from the Internet, and it furthermore allows the control of a plurality of different models and of home appliances 100 located at different locations across a country or across the globe.

Furthermore, a control command supply cloud 400 is provided and includes one or more control command supply servers 410 (short: supply server 410). These supply servers 410 are distinct from the home appliance control servers 310, i.e. these are physically separate servers arranged at a different location. The servers of the control command supply cloud 400 are not directly associated with any home appliance; the servers 410 provide a cloud on the Internet that is publicly accessible. The control command supply cloud 400 includes a repository 420 that stores sets of control instructions. The repository 420 can be provided in form of a database on one of the control command supply servers, e.g. 410, or can be provided on a separate storage server within the control command supply cloud 400. The instruction sets comprise control commands for controlling a particular type of home appliance. The repository 410 may for example comprise a plurality of instruction sets for controlling cooking appliances, and may comprise a plurality of instruction sets for controlling a washing or drying appliance. In some embodiments, all instruction sets are provided for controlling the same type of appliance, such as a cooking device.

The instruction sets comprise generic control commands for controlling the home appliance, such as setting an operating program of the home appliance, setting an operating parameter, such as temperature of the home appliance, setting a duration of the operating program, starting the home appliance, stopping the home appliance, and the like. As the instruction sets are generic, they cannot be used to directly control any home appliance.

The control command supply server 410 provides an interface for access by a user terminal device 250, such as a smartphone, a tablet, a laptop or the like. The interface may be web interface, but preferably, the terminal device 250 executes an application (or app) which communicates with the control command supply server 410 via the interface. The control command supply server 410 provides access to the repository 420 so that via the terminal device 250, a user can access the repository 420 and search for sets of control instructions. For this purpose, a user account may be provided on the control command supply server 410 for a user of the terminal device 250. Terminal device 250 can access this user account by sending credentials, such as username and password, associated with the user account which are either entered by the user into the terminal device 250 or which are stored on the terminal device 250.

In a similar manner, a user account for a user of the terminal device 250 may be provided on the home appliance control server 310. By means of the terminal device 250, the user can associate the home appliance 100 with his user account on the home appliance control server 310. The establishing of such association is described in detail further below. Once the association is established, the home appliance control server 310 can send control commands via the gateway 150 to the home appliance 100 to control the home appliance.

Home appliance 100 can in particular be configured as outlined above with respect to FIG. 1. Accordingly, home appliance 100 can only be controlled from predefined servers the addresses of which are stored in the home appliance 100, wherein such servers form part of the home appliance control cloud 300 and in particular include the server 310. The attempt of any server outside of the cloud 300 to control home appliance 100 will accordingly fail. Misuse of the remote control functionality of home appliance 100 can thus be avoided, and damage to home appliance 100 and dangerous operating situations can be prevented.

Home appliance control server 310 and control command supply server 410 are coupled over the Internet 200. If one of the instruction sets stored in the repository 220 is selected via the terminal device 250 for execution, the control command supply server 210 can send a request for remote control of the home appliance 100 to the home appliance control server 310. To ensure that the commands are transmitted by the owner of the home appliance 100 or another authorized person, which is the user of the terminal device 250, an authentication procedure is performed. This can be performed directly between the user terminal 250 and the home appliance control server 310, or may be performed via the control command supply server 410. Upon receiving such request, the home appliance control server 310 may for example request respective credentials, such as username and password, from the control command supply server 410, or directly from the terminal device 250. After receiving such credentials from the control command supply server 410, the home appliance control server may additionally request confirmation from the terminal device 250 to enable a remote control from such external server 410. Accordingly, a high degree of security can be ensured, and it is not possible for remote servers on the Internet to control the home appliance 100 without proper authorization.

Once the authentication has been successful, the control command supply server 410 can then send control commands associated with the selected instruction set to the home appliance control server 310. The home appliance control server 310 includes an application programming interface 320 that allows the use of a predefined set of control commands for controlling the home appliance 100. Application programming interface 320 may for example be a REST or RESTful API. Communication between servers 310 and 410 may occur using the https protocol, wherein the control commands may be transmitted by using JSON messages. A fast, efficient and generic transmission of control commands can thus be provided by control system 10.

After authentication, the home appliance control server 310 can accordingly receive respective messages comprising control commands from the external cloud 400 via the API 320. The control server 310 translates the received messages into a format understood by the home appliance 100. This may for example be a data format proprietary to the manufacturer of the home appliance 100. Control server 310 includes a respective gateway function 316 that performs such translation between the protocols. Control messages in the format predetermined by the message format of the home appliance 100 are thus transmitted via control server 310 over the Internet. The transport protocol for transmitting the messages between the home appliance 100 and the control server 310 may for example be MQTT. A fast, efficient and secure transfer of the control command messages can thus be ensured. In a similar fashion, the home appliance 100 can send information on its operating state, such as current operating parameters and events, to the control server 310. Control server 310 may for example monitor the home appliance 100 and may repeatedly request respective information, or the home appliance 100 may be configured to periodically transmit respective information. Safety-relevant events, such as overheating, may for example be directly transmitted by the home appliance 100 to the control server 310 upon occurrence. The control server 310 decodes respective received messages comprising such information and/or events and notifies the control command supply server 410 accordingly. It may for example send https requests with the information and/or event details to the server 410. In particular, webhooks may be used by control server 310 to notify the supply server 410.

Figure 9:
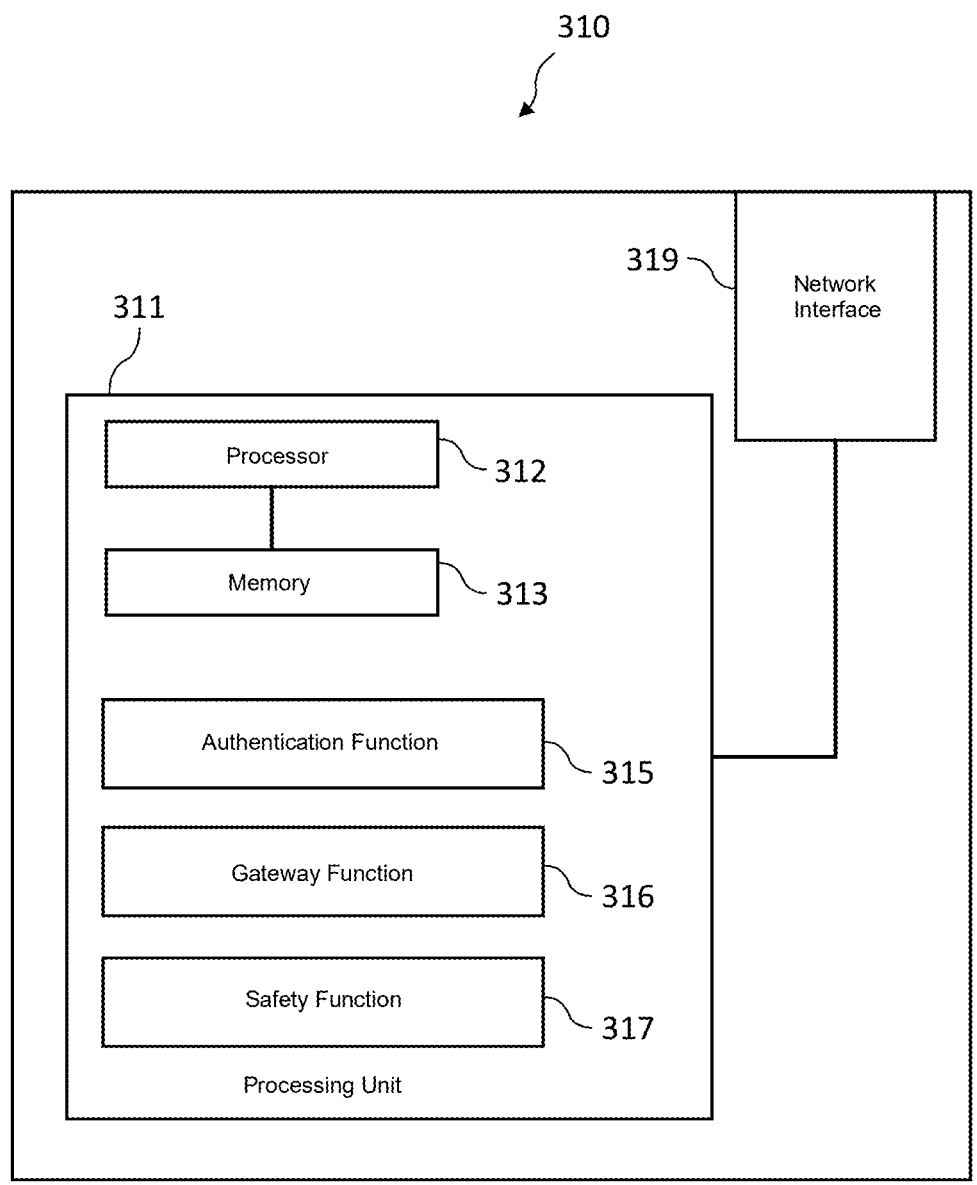
FIG. 9 is a schematic drawing showing a home appliance control server according to an embodiment of the invention.

An exemplary implementation of the home appliance control server 310 is shown in FIG. 9. The control server 310 includes a processing unit 311 that is coupled to a network interface 319. Via network interface 319, the control server 310 is connected to the Internet 200. Network interface 319 may for example include an Ethernet interface. The processing unit 311 includes a processor 312 and a memory 313. The memory 313 stores control instructions which are executed by the processor 312, and which are configured so that any of the method steps described herein with respect to the control server 310 are performed. Memory 313 can be configured as described above with respect to FIG. 1. Processor 312 can again be a microprocessor, e.g. a multi-core processor.

When executed by the processor 312, the control instructions stored in memory 313 can in particular implement the above-mentioned authentication function 315 and the gateway function 316. As mentioned above, authentication function 315 provides authentication of a user, or a user account on the control command supply server 410, trying to remote control the home appliance 100. Gateway function 316 provides translation between the messages transmitted between control server 310 and control command supply server 410 and the messages transmitted between control server 310 and home appliance 100.

It is also conceivable that the control server 310 implements a safety function 317. Upon being notified of an event or receiving information on the current operating state of the home appliance 100, the control server 310 may assess such received event and/or information to determine that a safety-relevant situation has occurred at the home appliance 100. The safety function 317 may for example check if the operating parameters of the home appliance 100 are within predefined limits. If this is not the case, in particular if a safety-relevant situation is identified by safety function 317, it may send respective control commands to home appliance 100 that are selected to remove such safety-relevant situation, for example by sending a stop command to stop the operation of the home appliance 100, or by adjusting an operating parameter, such as temperature, of the home appliance 100. Operational safety of home appliance 100 can thereby be improved.

It should be clear that the control server 310 may comprise further components not shown in FIG. 9, such as a user interface comprising for example a display and an input unit such as a keyboard, and may further comprise other components that are common to a server.

Turning back to FIG. 2, upon reception of the information and/or events from home appliance 100 at the control command supply server 410, the respective information can be forwarded to the terminal device 250 for display to a user. For example, in a cooking appliance, the current temperature in the oven cavity may be displayed to the user. The user may be enabled to make respective adjustments on operating parameters via the terminal device 250, which are then sent in the form of control commands via the supply server 410, the control server 310, and the gateway 150 to the home appliance 100. In some embodiments, the supply server 410 may derive from the received information and/or events further control commands for submission to the home appliance 100. For example, supply server 410 may determine based on the received information that the temperature in the oven cavity is too high or too low. It may send respective control commands to adjust the temperature in the oven cavity to the desired value to the home appliance 100 along the above described path via the control server 310.

Terminal device 250 may furthermore request the capturing of an image of the operation of the home appliance 100, such as an image of the oven cavity. A respective request is received by the supply server 410 and transmitted to the control server 310. Control server 310 forwards such request to the home appliance 100 which executes the request and captures a respective image. The image is transmitted by home appliance 100 to the control server 310. In an embodiment, control server 310 uploads the image to a storage server 351, which may form part of a storage cloud 350. Storage server 351 and/or servers of the storage cloud 350 may be distinct and physically separate from the servers of the home appliance control cloud 300. In other implementations, storage server 351 may form part of either the cloud 300 or the cloud 400. Storage server 351 may implement an object store in which the captured image is stored. The terminal device 250 can then be notified directly or via the supply server 410 that the captured image is available for download, or the image may be pushed to the terminal device 250. Terminal device 250 can then access the storage server 351 and can retrieve the captured image for display to the user.

In another embodiment, it is also conceivable that the image is directly transmitted by the control server 310 to the supply server 410, which in turn transmits the image to the terminal device 250. In the embodiment illustrated in FIG. 2, both, the control server 310 and the supply server 410, are relieved from having to store respective image data. The application running on the terminal device 250 and having access to the supply server 410 may be provided with a functionality that allows direct access to the storage server 351 for retrieving the image.

The terminal device 250 may accordingly be configured to execute a first application for accessing the control command supply server 410. It may further be configured to execute a second application that is configured to communicate with the home appliance 100 via the local network 160, for example to set up the home appliance 100, in particular to connect the home appliance 100 to the local network, such as a WLAN, and to associate the home appliance 100 with a user account on the control server 310. Such second application may furthermore be configured to directly communicate with the control server 310, for example for managing the user account on the server 310, for controlling associations with home appliances, or for receiving confirmation requests for enabling remote control.

The control server 310 and the supply server 410 may be located in different or the same geographical area or country as the home appliance 100. It is particularly advantageous if the control server 310 is located in the same country or the same region, such as the EU, as the home appliance 100, in particular with respect to data protection regulations which defer from country to country. For example, for home appliances located in the EU, a control server 310 located in the EU may be provided, while for home appliances located in Russia, a control server 310 located in Russia may be provided.

Figure 3:
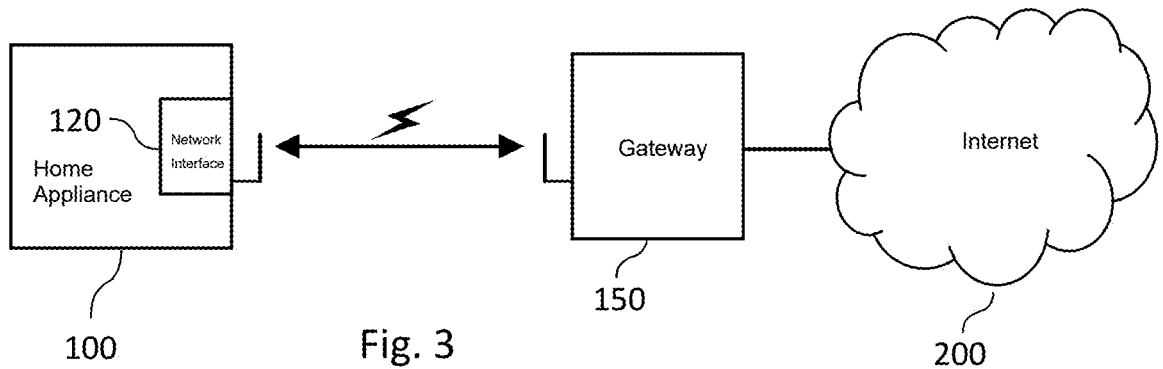
FIG. 3 is a schematic drawing showing a home appliance coupled to the Internet via a gateway according to an embodiment of the invention.
Figure 4:
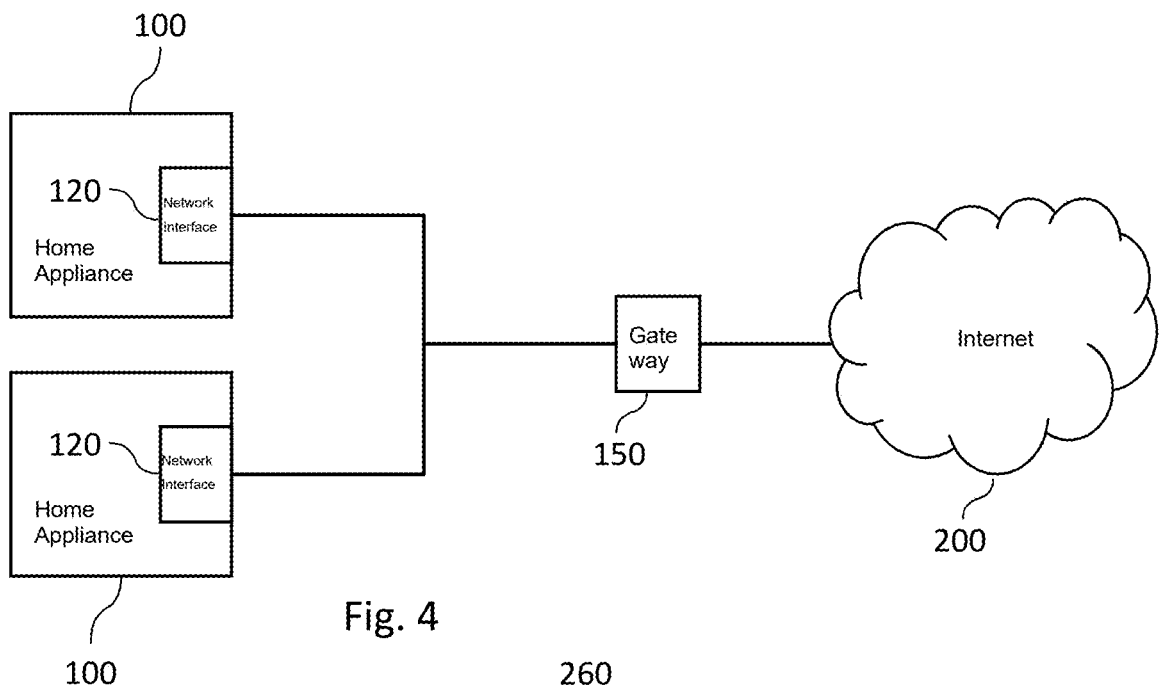
FIG. 4 is a schematic drawing showing a home appliance coupled to the Internet via a gateway according to an embodiment of the invention.
Figure 5:
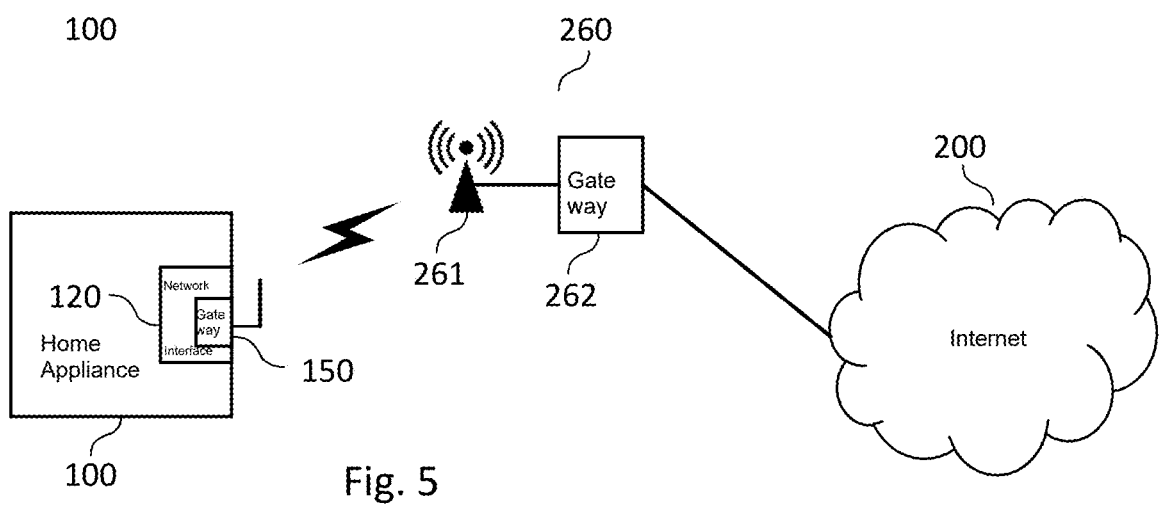
FIG. 5 is a schematic drawing showing a home appliance coupled to the Internet via a gateway according to an embodiment of the invention.

FIGS. 3 to 5 illustrate different embodiments of how the home appliance 100 can be connected to the Internet 200 via the gateway 150. In the example of FIG. 3, the gateway 150 is implemented as a wireless router that provides a wireless network into which the home appliance 100 is joined. Local network 160 is accordingly in this case a WLAN. Gateway 150 is connected to the Internet 200 in any known manner, such as for example via a cable network provider, DSL or the like.

It should be clear that further appliances 100 may be connected to the local network 160. In FIG. 4, the local network 160 is implemented as a local area network, to which two home appliances 100 are connected. Gateway 150 is implemented as a respective local area network router that provides routing between the Internet 200 and the local area network. The gateway 150 is again connected to the Internet 200 in any of the above described known manners.

In the example of FIG. 5, the gateway 150 is implemented in the home appliance 100. For example, the home appliance 100 may comprise a communication module for wirelessly communicating over a mobile telephony network. Such communication module may for example comprise a SIM card or the like to allow communication over such network. Gateway 150 thus provides a gateway between the mobile telephony network and the data communication internal to the home appliance 100. The respective mobile communication interface provided in the home appliance 100 may for example communicate using any known mobile telecommunication standard, such as GPRS, Edge, UMTS, LTE, 5G and the like. Reference symbol 261 designates a respective radio station, such as a base station, an eNodeB or 5G base station. Reference sign 262 denotes the respective gateway of the mobile communication system to the Internet 200.

In any of the outlined configurations, it is clear that the home appliance control server 310 is not part of the respective local network 160 and can communicate with the home appliance 100 only via the Internet 200 and the gateway 150. This is distinct from conventional systems in which for example the user terminal 250 communicates with an intelligent home device via the local smart home station located in the local network 160.

Figure 6:
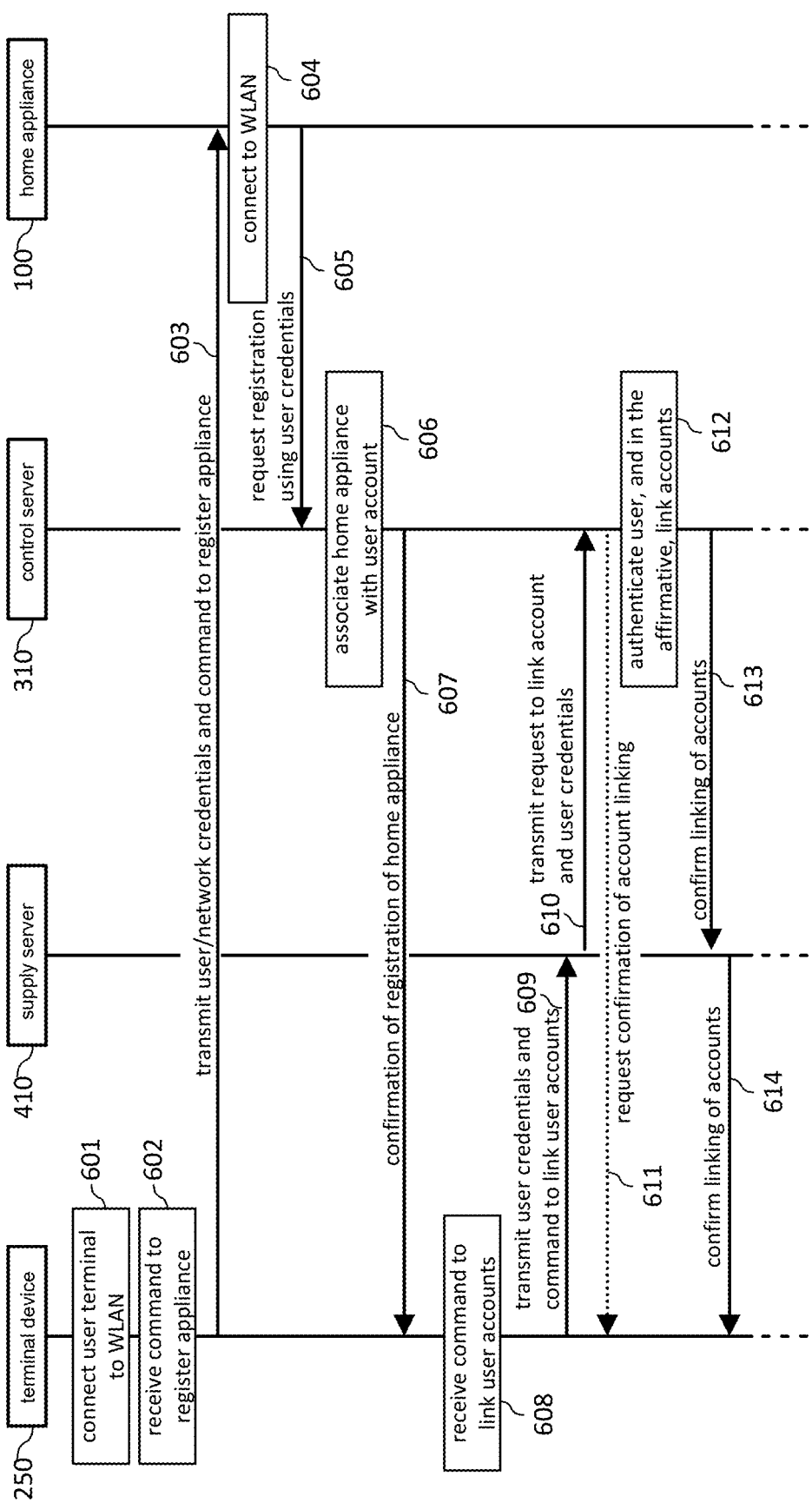
FIG. 6 is a flow diagram schematically showing a method according to an embodiment of the invention.

FIG. 6 is a flow diagram illustrating exemplary methods according to embodiments of the invention which may be performed for registration and authentication prior to the transmission of control commands from the supply server 410 to the control server 310. First, the home appliance may be joined to the local network 160, for example a WLAN, which may be performed by transmitting the respective data for joining the network from the user terminal 250 to the home appliance 100. In step 601, the user terminal 250 is connected to the WLAN. The user enters a command at the terminal device 250 to register the appliance 100 in the network and with the home appliance control server 310 (step 602). The terminal device 250 may transmit the user credentials for accessing the user account on the control server 310 and/or the network credentials for joining the WLAN to the home appliance 100, for example by a direct link, such as WiFi direct. It may furthermore transmit a command to register the appliance with the control server 310. Terminal device 250 may comprise a respective application running on the terminal device that submits respective messages to appliance 100 (step 603). In step 604, the home appliance uses the network credentials to connect to the WLAN. Furthermore, using the user credentials, such as username and password, the home appliance 100 requests registration for the user account at the control server 310 (step 605). The respective communication occurs via the local network 160, the gateway 150, and the Internet 200. The control server 310 confirms the user credentials for the user account and in response to a positive authentication associates the home appliance 100 with the respective user account (step 606). A respective confirmation of the association of the home appliance with the user account may then be provided by the control server 310 to the terminal device 250.

It should be clear that the above described joining of the home appliance 100 into the WLAN and the association of the home appliance 100 with the user account on the control server 310 may be performed separately and independently from each other. Furthermore, other ways of associating the user account on the control server 310 with the home appliance 100 are certainly conceivable, such as logging onto the user account by the terminal device 250 and entering a respective code of the home appliance to be registered, such as by scanning a bar-code on the home appliance or the like. Furthermore, any such registration may need to be confirmed, for example by pressing a button on the home appliance 100 so as to ensure that the user is physically present at the location of the home appliance 100 and is thus likely to be the owner of the home appliance.

The embodiment illustrated in FIG. 6 is particularly safe, since it is the home appliance 100 itself that requests the association of the home appliance with the user account. As the request is triggered by a direct communication between the terminal device 250 and the home appliance 100, it can be ensured that no remote device triggers such registration.

Furthermore, to facilitate control of the home appliance 100 via the supply server 410, the user account on the supply server 410 and on the control server 310 may be linked. In step 608, a respective command entered by the user is received at the terminal device 250. User device 250 in response transmits the user credentials for the user account on the control server 310 and a respective command to link to this user account to the supply server 410 (step 609). In step 610, the supply server 410 transmits the request to link its user account to the user account on the control server 310 and the user credentials to the control server 310. To increase the security, the control server 310 may then optionally request a confirmation of the account linking from the terminal device 250, as indicated with the dotted line (step 611) in FIG. 6. If the user is authenticated by the control server 310, and possibly the confirmation from the terminal device 250 is received, which may be checked by the authentication function 315, the control server 310 links the user accounts (step 612). The control server 310 then provides a confirmation of the linking of accounts to the terminal device 250, for example via the supply server 410 (steps 613 and 614) or directly. Such linked accounts may have the advantage of further facilitating control of the home appliance, since it can relieve the user of authenticating himself every time at the control server 310, as it may be sufficient that the user account of the supply server 410 authenticates itself at the control server 310.

As mentioned above, the terminal device 250 may be configured to run two applications, one for performing the communication with the home appliance 100 for registration with the control server 310, the other for communicating with the supply server 410.

Figure 7:
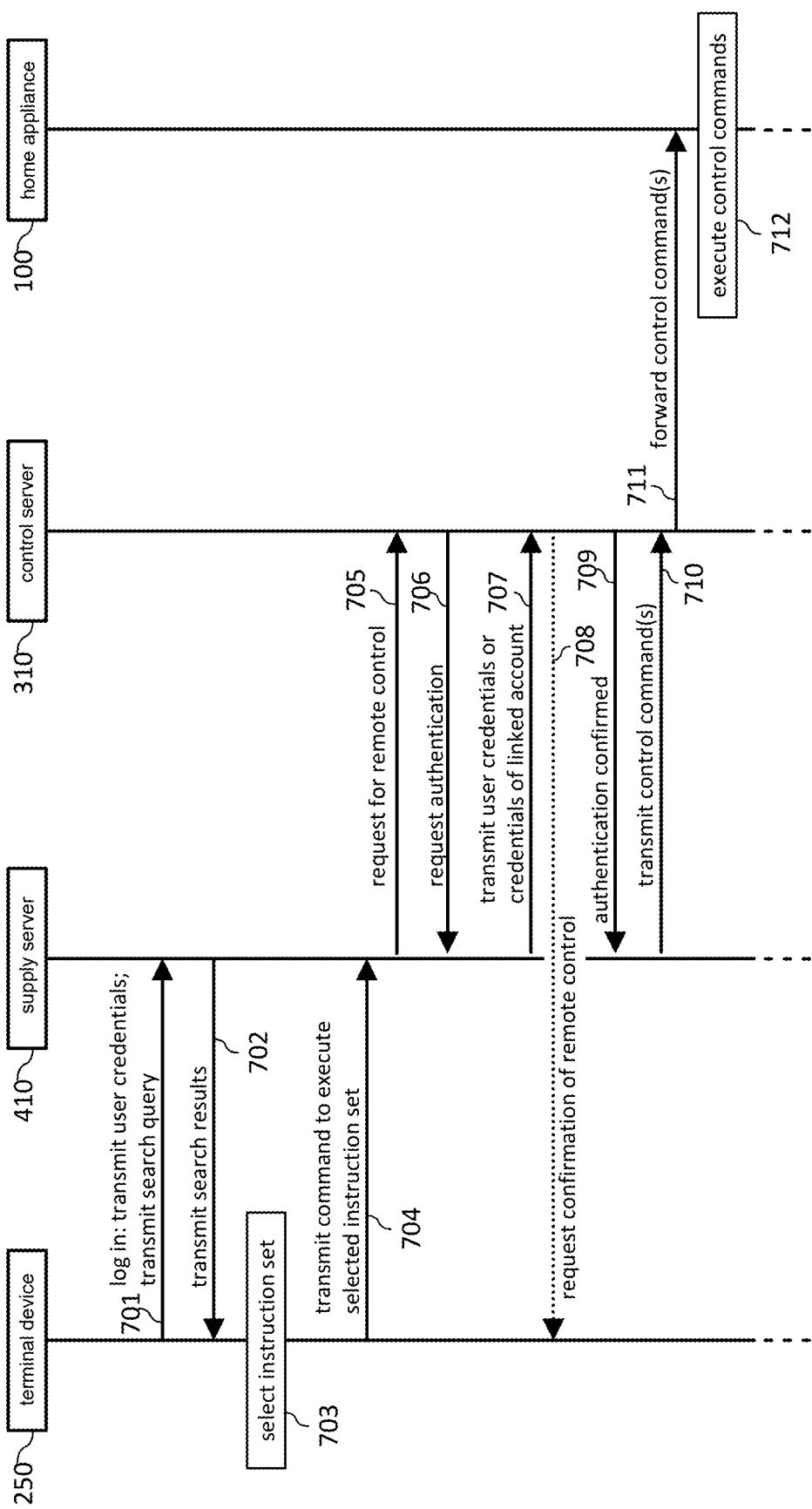
FIG. 7 is a flow diagram schematically showing a method according to an embodiment of the invention.

FIG. 7 shows a flow diagram illustrating the control of the home appliance from the terminal device 250. In step 701, the terminal device transmits user credentials to the supply server 410 for logging into the user account and furthermore transmits a search query for searching the repository 420 for a set of control instructions. The user credentials may be entered by a user on the terminal device or may be stored on the terminal device. The search query may for example be entered by the user on the terminal device using a keypad, such as a touchscreen keypad. In response to a positive authentication and the receipt of the search query, the supply server 410 performs a search in the repository in accordance with the search query and transmits the search results in step 702. The search results are displayed to the user by the terminal device 250 and the user selects an instruction set, for example by touchscreen input (step 703).

For example, the home appliance may be a cooking appliance, and the instruction sets may be associated with recipes, in particular they may comprise control commands that correspond to steps to be performed by the cooking appliance for preparing the food when following the recipe. The user may accordingly select a respective recipe in step 703. The user can thus browse the recipes stored in cloud 400 and select execution of the recipe on the terminal device.

In response to the selection, the terminal device transmits in step 704 a command to execute the selected instruction set to the supply server 410. In response, the supply server 410 may then request the remote control of the home appliance from the control server 310 (step 705). Alternatively, the request for remote control may be directly provided from the terminal device 250 to the control server 310. In response, the control server 310 requests authentication from the supply server 410 (or from the terminal device 250) in step 706. The user credentials or the credentials of the linked account (see the above steps 609 to 614) are then transmitted by the supply server 410 to the control server 310 (step 707). Alternatively, if the terminal device 250 directly requests remote control from the control server 310, the user credentials may be transmitted by the terminal device 250. Optionally, the control server 310 may request confirmation of the enabling of the remote control from the terminal device 250, for example directly as illustrated in FIG. 7 (step 708) or indirectly via the supply server 410. The user may then confirm the remote control by operating a respective button on the touchscreen of the terminal device 250.

After the authentication is confirmed and it is confirmed that remote control can be enabled, the control server 310 sends a respective confirmation message to the supply server 410 (step 709). The supply server 710 can then transmit respective control commands in accordance with the selected instruction set. The control server 310 then receives the control commands (via the API 320) and, using its gateway function 316, translates the commands into messages understood by the home appliance 100. In step 711, the control server 310 forwards the control commands to the home appliance 100. In step 712, the control commands are executed by the home appliance.

It should be clear that the instructions may comprise a relatively complex sequence of control commands, or may comprise a simple, in particular a single control command, such as start the home appliance, stop the home appliance, or adjust an operating parameter of the home appliance. For example, the instruction set may also comprise control commands such as a wait command causing the home appliance to wait for a user confirmation, or a display command causing the home appliance to display information to the user and the like. Accordingly, the user can follow the steps of the recipe and may for example be invited to place a respective good to be cooked into the oven cavity. Upon confirmation on the terminal device 250 or on the home appliance 100, the next control command may be transmitted and executed by the home appliance 100, or a control command queued at the home appliance 100 may be executed, such as turning on the heater of the cooking device.

It should also be clear that there may be situations in which the home appliance may not execute a received control command, for example if the home appliance is in an operating state that does not allow such execution. For example, the home appliance may be unable to receive the control command, due to not being switched on or being disconnected from the power grid or the local network, or the control command may not be in accordance with the present operating state. A respective error message that the control command can at present not be executed may then be sent by the home appliance to the control server 310, which may in turn forward the error message via the supply server 410 to the terminal device 250, or such error message may be generated by the control server 310.

In accordance with a chosen recipe, the set of control instructions may for example comprise the following control commands: set program to bottom heat; set target temperature to 200° C.; set duration to 20 minutes; start.

Figure 8:
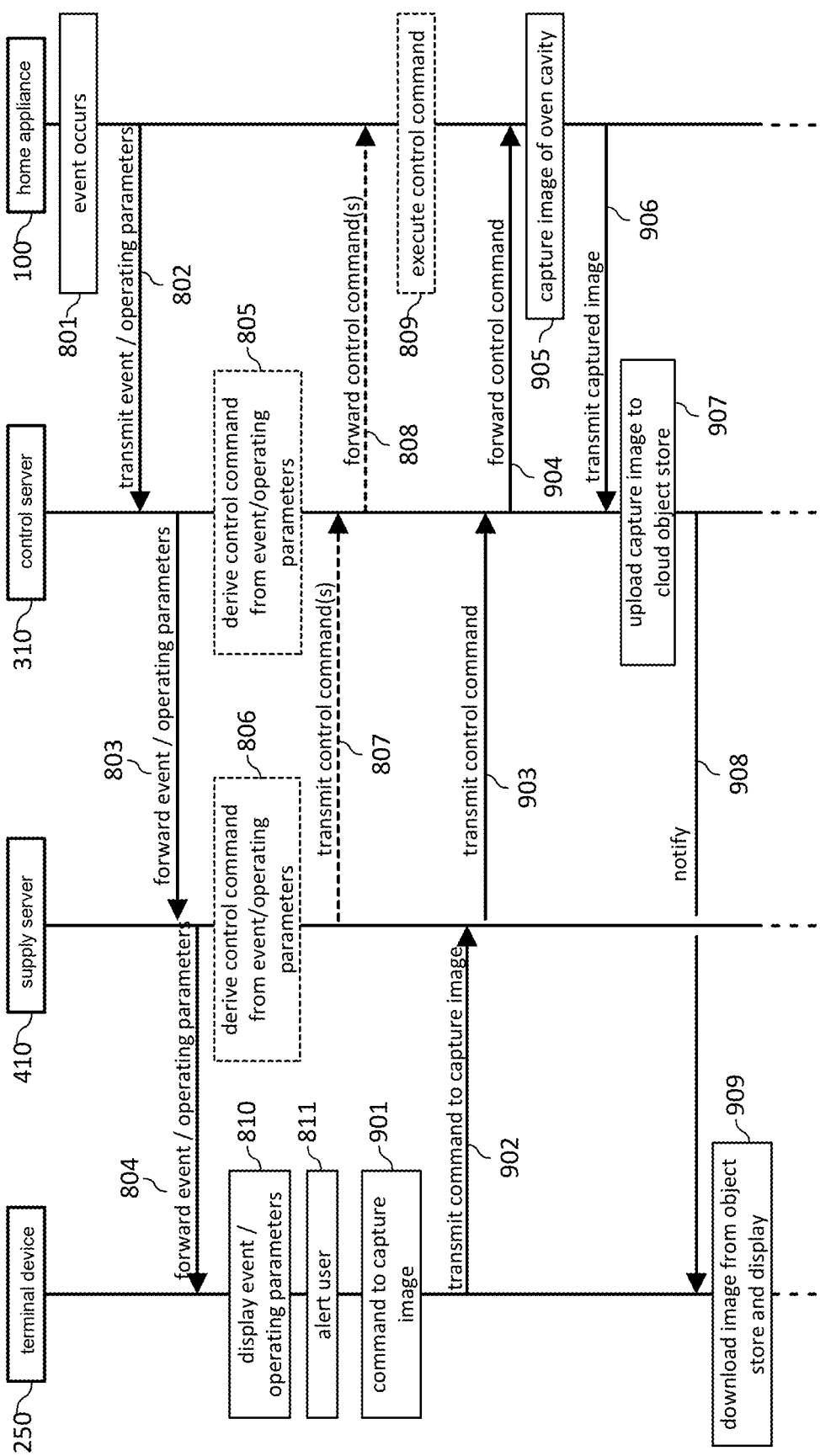
FIG. 8 is a flow diagram schematically showing a method according to an embodiment of the invention.

During operation, the home appliance may send events and information messages to the control server 310, or the control server 310 may request respective information from the home appliance 100. This is illustrated in FIG. 8, wherein an event occurs in step 801, such as the reaching of a predetermined temperature, the expiry of a timer, the occurrence of a fault, or the like. In step 802, the home appliance 100 transmits the event and/or respective information, such as operating parameters, to the control server 310. Control server 310 then decodes the received message and sends the respective information to the supply server 410, for example using the JSON format. Again, the translation between the message types may be performed by the gateway function 316. After receiving the information in step 803, the supply server 410 forwards the event/information to the terminal device 250 for display (step 804). As outlined above, it is conceivable that either one of the control server 310 or the supply server 410 derives one or more control commands from the received event and/or information (steps 805 and 806). This may for example occur at control server 310 to prevent an operation outside the predefined operating limits, to avoid damage to the home appliance 100 and to avoid dangerous situations. Likewise, the supply server 410 may derive an operating command in order to ensure that the desired operating parameters are achieved by the home appliance, for example the correct temperature and duration during the preparation of food according to the selected recipe. Respective control commands are transmitted and/or forwarded in the steps 807 and 808. The respective control command is received by the home appliance and is executed (step 809). It should be clear that these steps are optional.

In step 810, the terminal device 250 displays the received events and/or operating parameters. In dependence on the received event/operating parameters, the terminal device may alert the user in step 811, for example if a temperature or a duration is exceeded, or if a fault has occurred. An efficient and safe control of the home appliance can thus be achieved.

FIG. 8 furthermore illustrates method steps that may be performed for capturing an image of the operation of the home appliance in accordance with an embodiment of the invention. In step 901, the terminal device receives from a user a command to capture an image, for example by actuation of a button on a touchscreen. The command to capture the image is transmitted to the supply server 410 in step 902, which forwards the control command to the control server 310 in step 903. Again employing its gateway function 316, the control server 310 translates and forwards the control command to the home appliance (step 904). In step 905, the home appliance 100 executes the control command by capturing an image, for example of the oven cavity of a cooking appliance. It should be clear that other home appliances, such as a fridge, may capture an image of a different component, such as the interior of the fridge compartment. The captured image is transmitted to the control server 310 (step 906), which uploads the captured image to the cloud object store of the storage server 351 (step 907). In step 908, the control server 310 notifies the terminal device 250 of the availability of the image in the object store, and in response, the terminal device 250 downloads the image from the object store and displays the image in step 909. This may occur automatically or in response to a respective user input. As mentioned above, other implementations are conceivable, such as forwarding the image via the supply server 410 to the terminal device 250.

It should be clear that the methods illustrated in FIGS. 6, 7 and 8 relate to different aspects of the present application and may accordingly not be performed in the respective order. Rather, the steps illustrated in FIG. 6 may for example only be performed once prior to the first remote control of the home appliance via the Internet. On the other hand, steps 801 to 811 may be performed repeatedly during operation of the home appliance 100, prior to and after the execution of control commands in step 712. Similarly, steps 901 to 909 may be performed at any time during operation of the home appliance, upon request by the user.

Furthermore, as outlined above, several variations can be made to the disclosed methods. Furthermore, several of the above described method steps are optional, such as steps 801-811 and 901-909.

It should be clear that the home appliance, the control server 310, the supply server 410, and in particular the control system 10 may be configured to perform any of the method steps described with respect to FIGS. 6 to 8. Similarly, the respective components of the control system 10 illustrated in FIGS. 6 to 8 may have any of the configurations described above with respect to FIGS. 1 to 5 and 9.

The embodiments described above thus provide access to a plurality of sets of control instructions via the Internet, in particular via a publicly accessible cloud. At the same time, control of the home appliance via the Internet is enabled, while the access is limited and operational safety can thereby be ensured. Furthermore, e.g. for a cooking appliance, the supply cloud can use information received from the home appliance for providing information to the user and for feedback, it may in particular adjust any of the operating parameters, in particular cooking parameters, such as program, target temperature or duration, during a cooking session. Furthermore, the user can at any time use the application operating on the terminal device to take a photo of the current state of the cooking appliance, in particular of the oven cavity. A comprehensive, efficient and secure control of the home appliance 100 is thus provided.

While specific embodiments are disclosed herein, various changes and modifications can be made without departing from the scope of the invention. The present embodiments are to be considered in all respects as illustrative and non-restrictive, and all changes coming within the meaning and equivalency range of the appended claims are intended to be embraced therein.

| LIST OF REFERENCE SIGNS | |
| --- | --- |
| 100 | home appliance |
| 110 | controller |
| 111 | memory |
| 112 | processor |
| 120 | network interface |
| 130 | user interface |
| 141 | heater |
| 142 | grill |
| 143 | fan |
| 150 | gateway |
| 160 | local network |
| 200 | Internet |
| 250 | user terminal device |
| 260 | mobile communication network |

-continued

| LIST OF REFERENCE SIGNS | |
| --- | --- |
| 261 | radio station |
| 262 | mobile communication gateway |
| 300 | home appliance control cloud |
| 310 | home appliance control server |
| 311 | processing unit |
| 312 | processor |
| 313 | memory |
| 315 | authentication function |
| 316 | gateway function |
| 317 | safety function |
| 319 | network interface |
| 320 | application programming interface |
| 350 | storage cloud |
| 351 | storage server |
| 400 | control command supply cloud |
| 410 | control command supply server |
| 420 | repository |
| 601-909 | method steps |

The invention claimed is:

1. A method of controlling a home appliance,
wherein the home appliance is connected to an Internet network via a gateway,
wherein at least one home appliance control server of a home appliance control cloud is configured to communicate with the home appliance via the Internet network and the gateway,
wherein the home appliance is configured to execute control commands for operating the home appliance which are received by the home appliance from the Internet via the gateway only if the control commands are received from said home appliance control cloud,
wherein at least one control command supply server of a control command supply cloud is connected to the home appliance control cloud via the Internet network, the control command supply cloud comprising at least one repository storing sets of control instructions configured to operate the home appliance, the at least one repository being provided on or being accessible by the at least one control command supply server,
wherein the home appliance control cloud is distinct from the control command supply cloud, and
wherein a first user account for a user of a user terminal device is provided on said home appliance control server, the first user account being associated with the home appliance,
wherein the method comprises:
linking a second user account for the user of the user terminal device, provided on the control command supply server, to said first user account;
authenticating, by an authentication function of the home appliance control server, a request for remote control of the home appliance received from said control command supply server via the Internet network, the request being related to said first user account; and
responsive to a positive authentication, forwarding, from the home appliance control server to the home appliance, one or more control commands received by the home appliance control server from the control command supply server, the one or more control commands being part of a set of control instructions from the repository that is selected based on input received by the user terminal device,
wherein the one or more control commands forwarded to the home appliance are such that the home appliance executes the one or more control commands upon reception.

2. The method according to claim 1, wherein the control command supply server and/or the control command supply cloud is not directly associated with any home appliance to be controlled in accordance with the sets of control instructions.

3. The method according to claim 2, wherein the control command supply server and/or the control command supply cloud is not capable of directly controlling such home appliance by sending control commands to the home appliance via the Internet network without any intervening server outside said control command supply cloud which provides authentication of the commands.

4. The method according to claim 1, wherein the gateway is implemented in the home appliance or wherein the home appliance is connected to the gateway via a local connection or local network, said local connection or local network comprising: a local area network, a wireless local area network, a personal area network, a wireless personal area network, or a local peer to peer connection.

5. The method according to claim 1, wherein the user terminal device operates an application configured to establish a data connection to the control command supply server, the control command supply server providing an interface allowing the application to access and search the repository for sets of control instructions for selecting said set of control instructions.

6. The method according to claim 1, wherein the method further comprises:
responsive to a request to link the second user account to said first user account on the home appliance control server, authenticating, by the home appliance control server, the user of said first user account on the home appliance control server; and
responsive to a positive authentication, linking the second user account on the control command supply server to the first user account on the home appliance control server.

7. The method according to claim 1, wherein the authentication of a request for remote control comprises providing authentication information associated with the user of said first user account from the user terminal device or from the control command supply server to the home appliance control server, or supplying authentication information provided by the second user account on the control command supply server linked to said first user account on the home appliance control server from the control command supply server to the home appliance control server.

8. The method according claim 1, wherein the home appliance control server comprises an application programming interface, wherein the control command supply server provides the one or more control commands to the application programming interface of the home appliance control server via the Internet network.

9. The method according to claim 1, wherein the control command supply server encodes the one or more control commands in a JavaScript Object Notation, and formats and transmits the one or more encoded control commands to the home appliance control server.

10. The method according to claim 1, wherein the home appliance control server implements a gateway function that provides a conversion between a protocol used by the control command supply server to transmit said control commands and a protocol used by the home appliance control server to communicate control commands to the home appliance.

11. The method according to claim 1, wherein the home appliance control server uses a Message Queuing Telemetry Transport, protocol for communication with the home appliance.

12. The method according to claim 1, further comprising:
receiving, by the home appliance control server, a message from the home appliance comprising information and/or events related to the operation of the home appliance;
decoding, by the home appliance control server, the received message; and
forwarding, by the home appliance control server, the information and/or events comprised in the message to the control command supply server.

13. The method according to claim 12, wherein the control command supply server forwards the received information and/or events to the user terminal device and/or uses the received information and/or events to derive one or more control commands and provide the derived control command via the home appliance control server to the home appliance.

14. The method according to claim 1, further comprising:
receiving, by the home appliance control server and from the control command supply server, a control command to capture an image indicative of the operation of the home appliance;
transmitting, by the home appliance control server, a request to the home appliance to capture an image;
receiving, by the home appliance control server and in response to the request, a captured image from the home appliance;
transmitting the received captured image to a storage server that is connected to the Internet network; and
making accessible the stored captured image to the user terminal device.

15. The method according to claim 1, wherein the sets of control instructions provided by the repository comprise generic control commands for controlling different models of the same type of home appliance.

16. The method according to claim 1, wherein the control commands transmitted by the control command supply server in accordance with a selected set of control instructions comprises one, a combination, or all, of the following control commands:
a control command to set an operating program of the home appliance;
a control command to set one or more operating parameters of the selected operating program; and
a control command to start operation of the home appliance in accordance with the selected operating program and the set operating parameters.

17. The method according claim 1, wherein authenticating the request for remote control includes sending of a request from the home appliance control server to the user terminal device to confirm the enabling of remote control of the home appliance, and enabling remote control of the home appliance by the home appliance control server only if a user input is received that confirms the enabling of the remote control.

18. A computer program for controlling a home appliance, wherein the computer program comprises control instructions which, when executed by a data processor of a home appliance control server connected to the home appliance via the Internet network and a gateway, cause the data processor to perform the method of claim 1.

19. A control system for controlling the operation of a home appliance, wherein the home appliance is connected to an Internet network via a gateway, the control system comprising:
a home appliance control server of a home appliance control cloud connected to said Internet network, wherein the home appliance control server is configured to communicate with the home appliance via the Internet network and the gateway;
the home appliance, wherein the home appliance is configured to execute control commands for operating the home appliance which are received by the home appliance from the Internet network via the gateway only if said control commands are received from said home appliance control cloud; and
a control command supply server of a control command supply cloud, wherein the control command supply server is connected to the home appliance control cloud via the Internet network, the control command supply cloud comprising at least one repository storing sets of control instructions configured to operate the home appliance, the at least one repository being provided on or being accessible by the control command supply server;
wherein the home appliance control cloud is distinct from the control command supply cloud,
wherein the control command supply cloud is configured to provide an interface for access by a user terminal device, the interface being configured to enable selection of one of said sets of control instructions via the user terminal device,
wherein the home appliance control server is configured to establish an association between the home appliance and a first user account for a user of the user terminal device provided on said home appliance control server,
wherein the control command supply server is configured to provide a second user account for said user of the user terminal device, wherein the second user account and the first user account are linked, and
wherein the home appliance control server is configured to further implement an authentication function configured to authenticate a request for remote control of the home appliance received from said control command supply server via the Internet network, the request being related to said first user account, and responsive to a positive authentication, to forward, from the home appliance control server to the home appliance, one or more control commands received by the home appliance control server from the control command supply server in accordance with the selected set of control instructions for execution by the home appliance.

* * * * *